United States Patent
Griffin et al.

(10) Patent No.: US 9,462,913 B1
(45) Date of Patent: Oct. 11, 2016

(54) LIQUID STORAGE SYSTEM

(71) Applicants: Brian J. Griffin, Cold Spring, KY (US); Martin W. Griffin, Cold Spring, KY (US)

(72) Inventors: Brian J. Griffin, Cold Spring, KY (US); Martin W. Griffin, Cold Spring, KY (US)

(73) Assignee: Griffin Industries LLC, Cold Spring, KY (US)

( * ) Notice: Subject to any disclaimer, the term of this patent is extended or adjusted under 35 U.S.C. 154(b) by 250 days.

(21) Appl. No.: 13/631,383

(22) Filed: Sep. 28, 2012

Related U.S. Application Data

(63) Continuation-in-part of application No. 13/009,310, filed on Jan. 19, 2011, now Pat. No. 8,596,489.

(60) Provisional application No. 61/296,713, filed on Jan. 20, 2010.

(51) Int. Cl.
*A47J 37/12* (2006.01)
*B65D 21/02* (2006.01)
*G01F 25/00* (2006.01)

(52) U.S. Cl.
CPC ........ *A47J 37/1271* (2013.01); *B65D 21/0237* (2013.01); *G01F 25/0061* (2013.01)

(58) Field of Classification Search
CPC ......... B65B 90/38; B65B 21/02; E03D 1/01; B65D 25/54; B65D 88/02; B65D 88/54; B65D 88/74; B65D 21/0235; B65D 21/0237; B65F 2240/142; A47J 37/1271
USPC ............... 73/290 R; 206/501; 220/86.1, 565, 220/567.2, 23.2, DIG. 15, DIG. 13, 571–573
See application file for complete search history.

(56) References Cited

U.S. PATENT DOCUMENTS

| | | | |
|---|---|---|---|
| 132,020 A * | 10/1872 | Odell | 215/6 |
| 133,123 A | 11/1872 | Shea et al. | |
| 2,746,609 A | 5/1956 | Welsh | |
| 2,789,201 A | 4/1957 | Sherwin | |
| 3,916,587 A * | 11/1975 | Cox | B65D 90/12 52/192 |
| 4,028,747 A | 6/1977 | Newton | |
| 4,148,105 A * | 4/1979 | Napolitano | 4/353 |
| 4,489,839 A * | 12/1984 | Epperson | 215/10 |
| 4,573,595 A * | 3/1986 | Mednis | 215/10 |
| 4,603,443 A | 8/1986 | Stewart | |
| 4,666,068 A * | 5/1987 | Bush | 222/546 |
| D301,688 S * | 6/1989 | Green | D9/741 |
| 4,891,980 A * | 1/1990 | Kawai et al. | 73/290 R |
| 5,249,511 A | 10/1993 | Shumate et al. | |

(Continued)

OTHER PUBLICATIONS

AQUADEVICES, archived Feb. 9, 2006, http://web.archive.org/web/20060209062818/http://www.aquadevices.50megs.com.*
DELTA, archived Jan. 9, 2009, http://web.archive.org/web/20090302054412/http://www.buyautotruckaccessories.com/product.cfm/cf-bin/pn.delta-fuel-n-tool-transfer-tank-toolbox-combo.*
Non-Patent Literature CENTENNIAL, accessed at http://web.archive.org/web/20080828045217/http://www.ba-industrial.com/centmold.htm, archives on Aug. 28, 2008.*

(Continued)

*Primary Examiner* — Laura Martin
*Assistant Examiner* — Irving A Campbell
(74) *Attorney, Agent, or Firm* — Middleton Reutlinger; Robert H. Eichenberger; Chad D. Bruggeman

(57) ABSTRACT

A liquid storage system. The liquid storage system may include one or more storage tanks including a used oil tank and a virgin oil tank. A first tank may include a storage tank having an upright section and a base section. A volume extends between the upright and base section. An inlet and outlet are coupled to the volume for adding and extracting fluid from the storage tank, respectively. There is at least one shelf coupled to the upright section of the storage tank. A second tank may be situated adjacent the first tank.

19 Claims, 12 Drawing Sheets

(56) References Cited

U.S. PATENT DOCUMENTS

| | | | |
|---|---|---|---|
| 5,548,278 A * | 8/1996 | Oliver et al. | 340/605 |
| 5,706,873 A * | 1/1998 | Benoit | F16N 31/002 |
| | | | 137/513.7 |
| 5,983,411 A * | 11/1999 | Demoret | 4/353 |
| 6,157,776 A | 12/2000 | Onken | |
| 6,367,096 B1 | 4/2002 | Quintana | |
| 6,934,977 B1 | 8/2005 | Quintana et al. | |
| 7,107,633 B2 * | 9/2006 | Cummings, III | 4/661 |
| 2001/0030191 A1 * | 10/2001 | Bopp, III et al. | 220/23.4 |
| 2005/0184069 A1 * | 8/2005 | Campos | 220/23.86 |
| 2007/0000044 A1 | 1/2007 | Huei | |
| 2007/0277301 A1 | 12/2007 | Quintana | |
| 2008/0163414 A1 | 7/2008 | Andronyk | |
| 2010/0065466 A1 * | 3/2010 | Perkins | 206/600 |
| 2011/0036873 A1 * | 2/2011 | Peckels | 222/476 |
| 2011/0174825 A1 * | 7/2011 | Griffin | A47J 37/1271 |
| | | | 220/565 |
| 2011/0186592 A1 | 8/2011 | Palazzo et al. | |

OTHER PUBLICATIONS

Non-Patent Literature CHEMTAINER, accessed at http://web.archive.org/web/20110725144938/http://www.chemtainer.com/drawings/TC6440DC.pdf, archived on Jul. 25, 2011.*

The Stool Pigeon: I Can See Clearly Now; archived Sep. 19, 2009, http://web.archive.org/web/20090919150607http://thestoolpigeonblog.blogspot.com/2009.07/i-can-see-clearly-now.html.

Kohler_K-3564_Saile elongated one-piece toilet with dual flush technology, archived May 1, 2008, http://web.archive.org./web/20080501115936/http://www.us.kohler.com/onlinecatalog/detail.jsp?from=thumb&frm=&module=ets&item=13150202[]_num=3564&section=2&category=13.

Frontline International, Inc., Brochures of Products, (c) 2006.

Frontline International, Inc., Specifications for 24", 30", and 42" Waste Cooking Oil Tank System Layout, 2006.

Frontline International, Inc., Brochures of Products, (c) 2007.

* cited by examiner

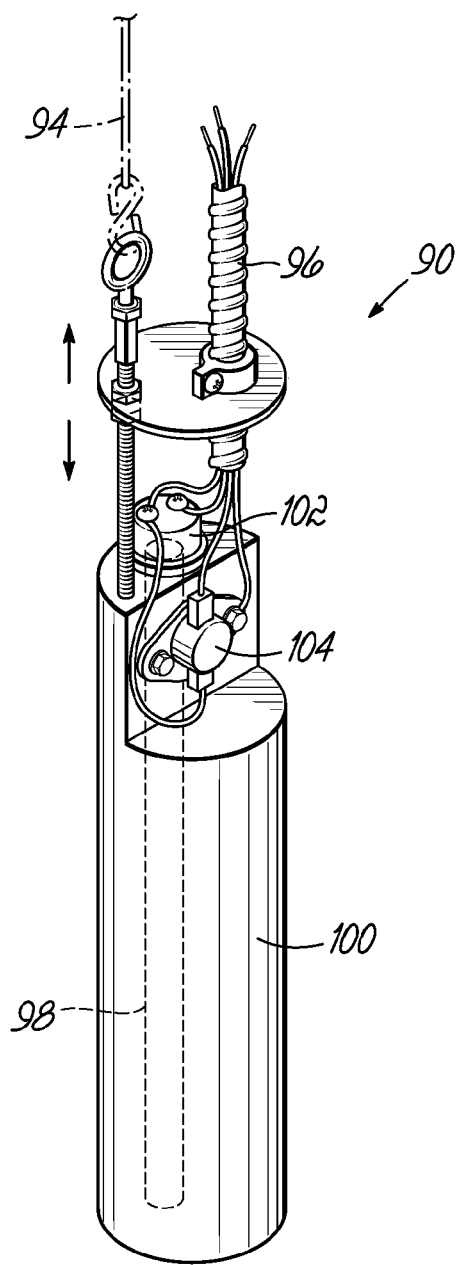
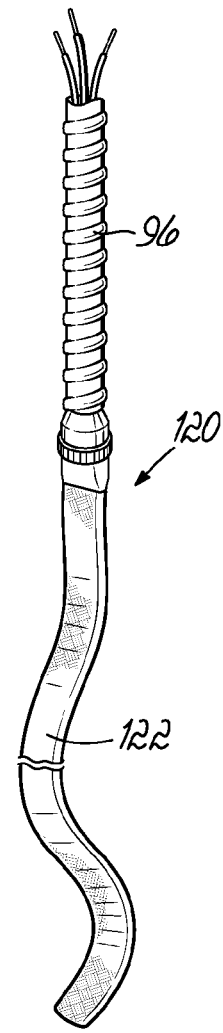
FIG. 5A
FIG. 5B

LIQUID STORAGE SYSTEM

CROSS-REFERENCE TO RELATED APPLICATION

This is a continuation-in-part of U.S. patent application Ser. No. 13/009,310, filed on Jan. 19, 2011, which claims priority to and benefit from U.S. Provisional Application Ser. No. 61/296,713, filed on Jan. 20, 2010, the disclosures of both of which are incorporated by reference herein, in their entirety.

FIELD OF THE INVENTION

The present invention relates generally to liquid storage systems and, more particularly, to cooking oil and grease storage systems.

BACKGROUND

Restaurants, food processing facilities, and the like generate used cooking oil or other used liquids during their normal operations. Typically, this used oil is stored in either indoor or outdoor storage tanks. Periodically, a used oil reclamation service will come to the restaurant or food processing facility and transfer the used oil from the storage tank to a tank mounted on a truck, for example, for removing and disposing the used oil.

To reduce the number of times the reclamation service must return to the restaurant or food processing facility, the storage tank is generally large enough to hold several hundred gallons of used oil. Known and conventionally-used storage tanks, such as 55-gallon steel drums, are often bulky in size and difficult to maneuver. Because each steel drum is limited in its volumetric capacity, restaurants or food processing facilities often require two or more steel drums to achieve sufficient storage capacity; however, multiple steel drums or other storage tank systems consume a lot of valuable floor space that could otherwise be used for storing food and other items.

Furthermore, unused, fresh, or virgin grease and cooking oil for use in these facilities are often stored away from the used liquids increasing the floor space consumed.

SUMMARY OF THE INVENTION

The present invention overcomes the foregoing and other shortcomings and drawbacks of known conventional systems for storing and disposing of used cooking oil. While the invention will be described in connection with certain embodiments, it will be understood that the invention is not limited to these embodiments. On the contrary, the invention includes all alternatives, modifications, and equivalents as may be included within the spirit and scope of the present invention.

According to one illustrative embodiment, the invention is directed to a liquid storage system. The liquid storage system includes a storage tank having an upright section and a base section. A volume extends between the upright and base section. An inlet and an outlet are coupled to the volume for adding and extracting a liquid from the storage tank, respectively. There is at least one shelf coupled to the upright section of the storage tank.

In another illustrative embodiment, the invention is directed to an oil storage system. The oil storage system includes a storage tank having an upright section and a base section. A volume extends between the upright and base section. An inlet and an outlet are coupled to the volume for adding and extracting oil from the storage tank, respectively. A tank heater within the volume of the storage tank selectively heats the oil within the storage tank to a predetermined temperature. There is at least one shelf coupled to the upright section of the storage tank.

According to yet another embodiment, the invention is directed to a liquid storage system that includes a base section and an upright section. The base section has a first dimension and a first height; the upright section has a second dimension and a second height. A volume for holding liquid is common to the base and upright sections. There is an inlet and an outlet coupled to the volume, for adding and extracting liquid, respectively. A surface, common to both the base and upright sections, lies substantially within a vertical plane. The first dimension of the base section extends from the surface and is greater than the second dimension of the upright section extending from the surface. The ratio of the first height to the second height ranges from about 4:1 to about 8:1.

The above and other objects and advantages of the present invention shall be made apparent from the accompanying drawings and the description thereof.

BRIEF DESCRIPTION OF THE FIGURES

The accompanying drawings, which are incorporated in and constitute a part of this specification, illustrate embodiments of the invention and, together with a general description of the invention given above, and the detailed description of the embodiments given below, serve to explain the principles of the invention. In the drawings, like reference characters generally refer to the same parts throughout the different views. Also, the drawings are not necessarily to scale, emphasis instead generally being placed upon illustrating the principles of the invention.

FIG. 5A is a perspective view of one embodiment of a heater, shown in partial cross-section, suitable for use with an embodiment of the invention.

FIG. 5B is a perspective view of another embodiment of a heater suitable for use with an embodiment of the invention.

DETAILED DESCRIPTION OF THE INVENTION

Figure 1:
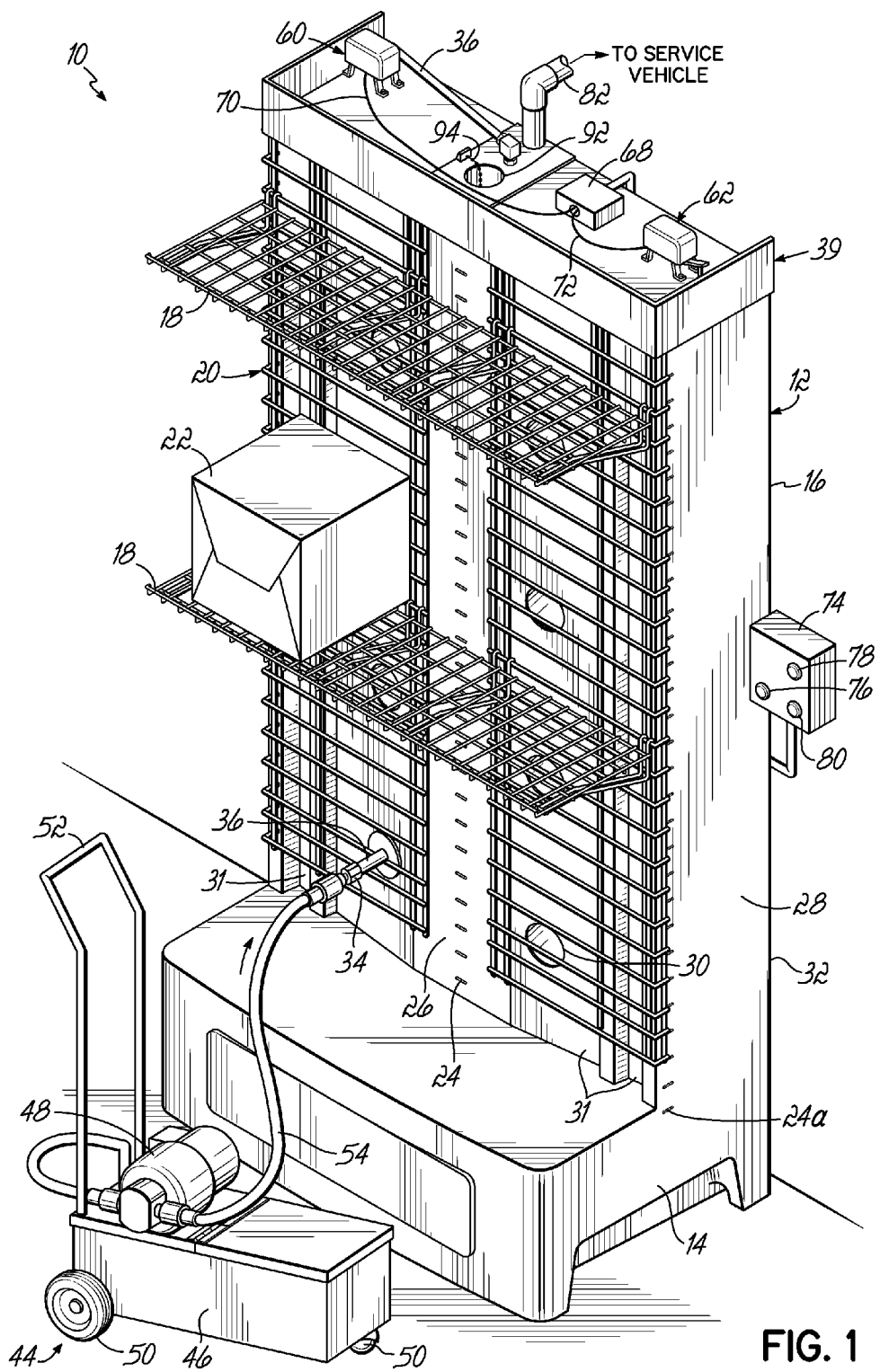
FIG. 1 is a perspective view of a storage system with a plurality of shelves and a mobile storage tank in accordance with one embodiment of the invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention and that other alternative mechanical configurations are possible.

The term "controller" is used herein generally to describe various apparatus relating to the operation of one or more liquid storage systems. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present embodiments discussed herein. The terms "program" or "computer program" are used herein in a generic sense to refer to any type of computer code (e.g., software or microcode) that can be employed to program one or more processors or controllers.

The liquid storage system described below and shown in the drawings has a smaller footprint than traditional storage tanks, thereby consuming less floor space than conventional storage tanks. In addition, the liquid storage system includes one or more shelves that can hold items such as food and, in particular, boxes of new oil to replace the used oil removed from a restaurant's fryer and other cookware and appliances.

Figure 2:
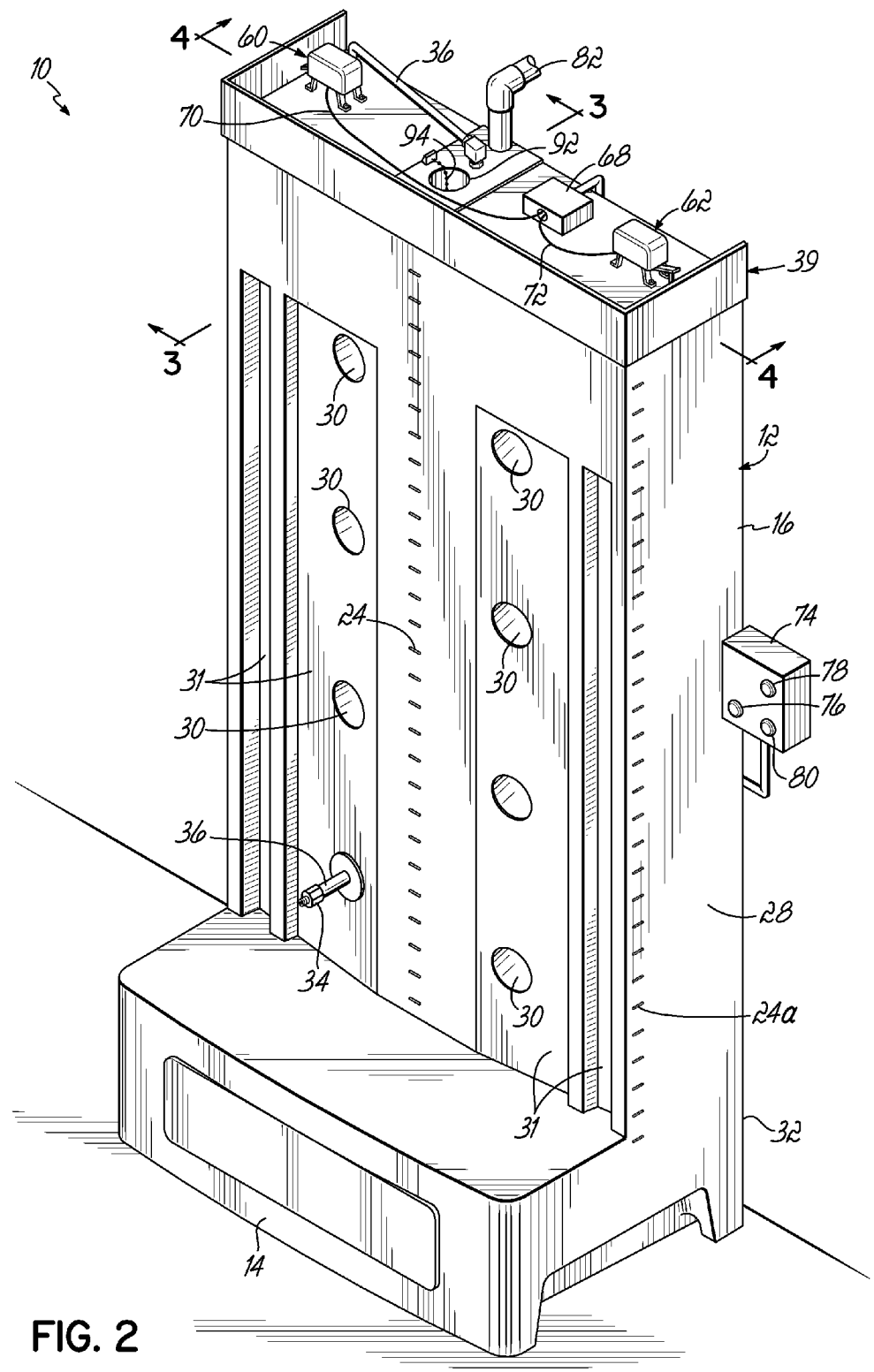
FIG. 2 is another perspective view of the storage system of FIG. 1 without the plurality of shelves and the mobile storage tank.

Referring to FIGS. 1 and 2, the storage system 10 includes a storage tank 12 which has a base section 14 and an upright section 16. A plurality of wire shelves 18 are removably attached to the upright section 16 via a pair of vertical hangers 20 (FIG. 2) and is configured to provide storage space for various items or supplies 22. For example, these supplies 22 may include boxes or containers of clean, unused oil, other consumable items used within the facility, replacement components for deep fryers or like devices, and/or replacement components for the storage system 10. The wire shelves 18 can be removed and repositioned to accommodate items 22 of different sizes. Optionally, additional shelves 18 may be added to the upright section 16. Further details of the plurality of shelves 18 are provided below. Although not shown, a kick plate or guard may be positioned about the outer periphery of the base section 14.

The storage tank 12 in the figures is made from a polyethylene, for example a high density hexane copolymer that is NSF 61 rated, a polypropylene, or other similar material that is at least partially transparent or translucent so that the liquid level in the tank 12 can be readily observed external to the tank 12. Furthermore, a graduated scale 24, for example, one or more marked indicia or dimples, may be located on a front-facing portion 26 of the storage tank 12 so that the liquid level in the tank can be readily determined. A graduated scale 24a may additionally or alternatively be positioned on one or both side portions 28 of the storage tank 12 as shown in FIGS. 1 and 2.

Figure 3:
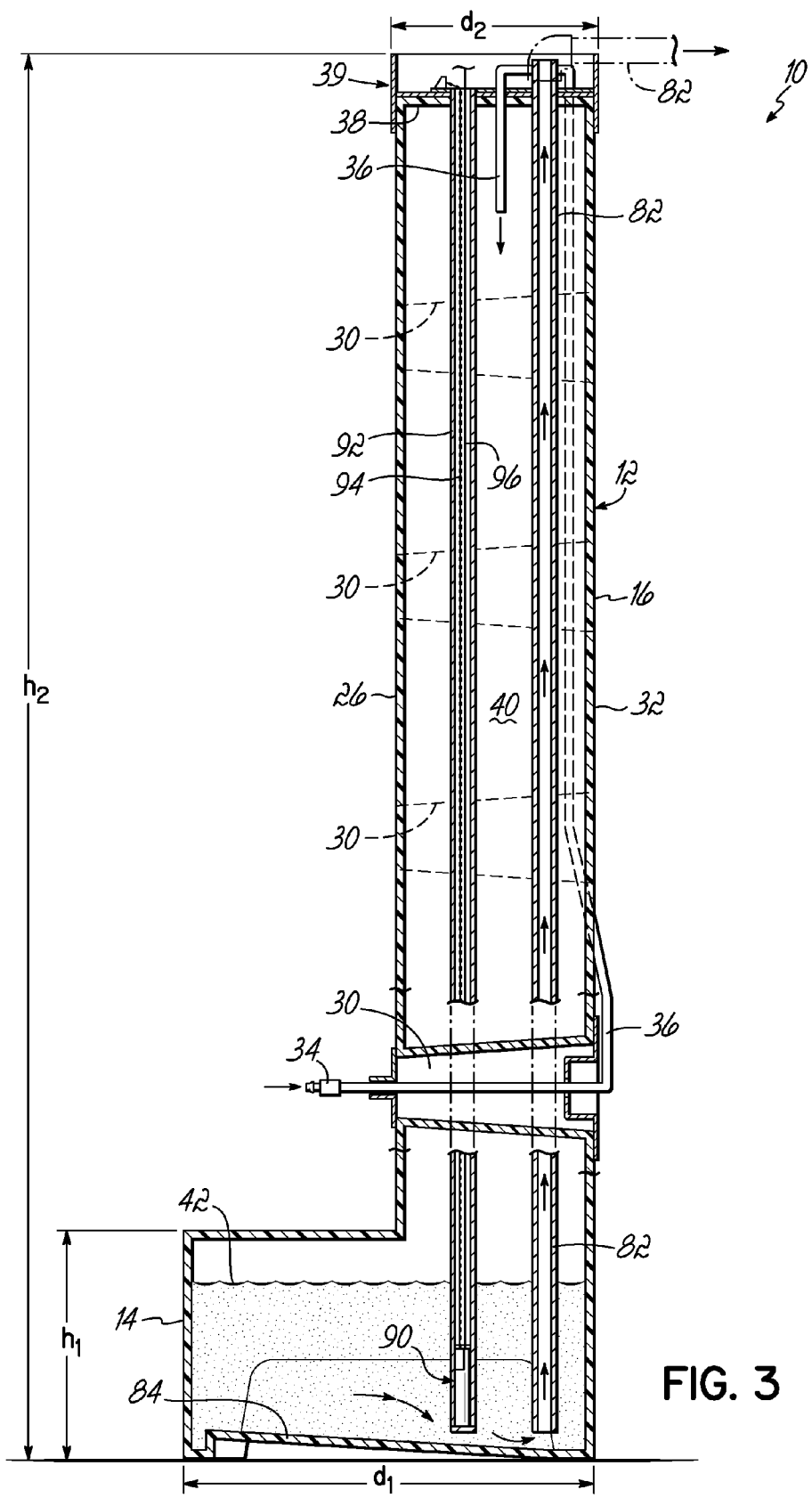
FIG. 3 is a cross-sectional view of the storage system taken along line 3-3 in FIG. 2.

The upright section 16 of the storage tank 12 may include one or more passageways, for example molded holes 30, that extend between the front-facing portion 26 and a rear portion 32 (FIG. 3). The one or more molded holes 30 may permit passage of liquid conduits, as described below; reduce structural flexibility by increasing the rigidity of the storage tank 12, resisting a tendency of the walls of the storage tank 12 to bulge with a high liquid volume, and reducing the overall weight of the storage system 10. It would be readily appreciated that while eight molded holes 30 are shown in the illustrative embodiments herein, this number is not limiting. Other internal structural bracing may be used to increase the rigidity of the storage tank 12 and may supplement or replace altogether the molded holes 30.

The upright section 16 may also include one or more recesses 31, with or without the molded holes 30, to further provide structural strength to the storage tank 12. While each of the particular recesses 31 shown in FIG. 2 extends nearly the full length of the upright section 16, other shapes and lengths of recesses may be used.

While the base and upright sections 14, 16 may be configured to any number of shapes and sizes, constructing the base section 14 to have a larger cross-sectional area, or footprint, than the upright section 16 may provide structural stability. Yet further structural stability may be provided by molding the base section 14 to have thicker walls than the walls comprising the upright section 16. In one exemplary embodiment, the base section 14 may be configured to contain about 100 gallons (378.5 L) of used oil 42 (FIG. 3), e.g., the approximate amount of used oil contained within the two conventional steel drum storage tanks. The dimensions of the upright section 16 may then be selected to achieve a desired additional used oil storage capacity. In this and other embodiments, the dimensions of the upright section 16 may be selected such to provide a desired ratio of the cross-sectional area of the base section 14 to the cross-sectional area of the upright section 16 while providing an overall used oil storage capacity. For instance, a storage tank could be constructed to have an area ratio of 2:1 with a storage capacity of about 150 gallons (567.8 L). Alternatively, the ratio of the total height of the storage tank 12 ($h_2$) to the height of the base section 14 ($h_1$) may be selected to achieve a ratio of between about 4:1 and about 8:1, and advantageously between about 5:1 and about 6:1. For example, if $h_1$ was 15 inches and $h_2$ was 78 inches, then the ratio is 5.2:1. If the storage tank 12 was 90 inches tall, then the ratio would be 6.0:1. Furthermore, other physical constraints may dictate the dimensions of the storage tank 12, such as the ceiling height of the particular restaurant or food processing facility. For example, a storage tank 12 having an overall height of 7.5 ft (2.3 m) may be configured to store 200 gallons (757.1 L) while a tank having an overall height of 6.5 ft (2.0 m) may be configured to store 175 gallons (662.4 L).

In some embodiments, the storage tank 12 may optionally, though not necessarily, include a surface common to both the base and upright sections 14, 16 that lies in a substantially vertical plane. The surface is illustrated herein as the rear portion 32 that is coextensive between the base and upright sections 14, 16. These embodiments would be particularly useful when positioning the storage tank 12 along a wall so as to minimize wasted space typically associated with placing a cylindrical, conical, or like shaped objects along a planar surface. In that regard, the base section 14 would extend by a first dimension ($d_1$) away from the surface and the upright section 16 would extend by a second dimension ($d_2$) away from the surface. It would be readily understood by those of ordinary skill in the art that $d_1$ or $d_2$ or both may be a length, a depth, a radius, a focal distance, or any other appropriate measure for the particular shape incorporated by the storage tank design. However, it would be further understood that neither $d_1$ nor $d_2$ would exceed the width of the surface; otherwise, wasted space may again occur. Generally, $d_1$ will exceed, or be greater than, $d_2$ so as to recess, or offset, the upright section 16 with respect to a front or forward edge of the base section 14. In these embodiments, the shelves 18 (FIG. 1) may extend from the upright section 16, over the base section 14, and substantially within the recess without increasing, or only minimally increasing, the footprint of the storage tank 12.

To facilitate the processing of filling the storage tank 12 with used oil 42 (FIG. 3), the storage tank 12 includes a quick disconnect inlet fitting 34, which is connected to a conduit 36 (for example, a tube) that extends through one of the molded holes 30 of the storage tank 12. As shown in FIG. 3, the conduit 36 exits the molded hole 30 at the rear portion 32 of the storage tank 12 and continues to a top portion 38 of the storage tank 12. The conduit 36 enters an interior space, or volume 40, contained within the storage tank 12 via an opening in the top portion 38 (FIG. 3) and extends at least partially into the volume 40.

The top portion 38 (FIG. 3) may further include a cap 39 that is configured to reside on the top portion 38 and to support one or more electronics, sensors, or liquid conduits, such as the conduit 36, as described in detail below. The cap 39 may be constructed from metallic or polymeric materials as appropriate or desired.

When the used oil 42 (FIG. 3) in a fryer needs to be changed, the used oil 42 (FIG. 3) is extracted from the fryer (not shown) and placed into a mobile storage tank, commonly referred to as a caddie 44 (FIG. 1). The particular illustrated caddie 44 includes a tank 46 and a pump 48 that is made portable via wheels 50 and a handlebar 52. A conduit 54 (i.e., tubing or hose) extends from the pump 48, which may be operated in both a fill and an empty mode. Accordingly, when the fryer needs to be emptied and cleaned, the caddie 44 is transported to the fryer and the conduit 54 is attached thereto. The pump 48 is operated in the fill mode such that the used oil 42 (FIG. 3) moves from the fryer to the tank 46. The caddie 44 is then moved to the storage system 10 and the conduit 54 coupled to the inlet fitting 34. The pump 48 on the caddie 44 is then turned on and operated in the empty mode such that the used oil 42 (FIG. 3) is pumped through the conduit 54 of the caddie 44 and into the conduit 36 of the storage tank 12. When the caddie 44 is empty, the pump 48 is turned off and the conduit 54 is disconnected from the fitting 34.

Alternatively, though not specifically shown, the used oil 42 (FIG. 3) may be directly transferred from the fryer to the storage tank 12. For example, a pump (not shown) may be included on the fryer and having a conduit that extends from the fryer to the inlet fitting 34. Operation of the pump transfers the used oil 42 (FIG. 3) directly from the fryer to the storage tank 12.

Figure 4:
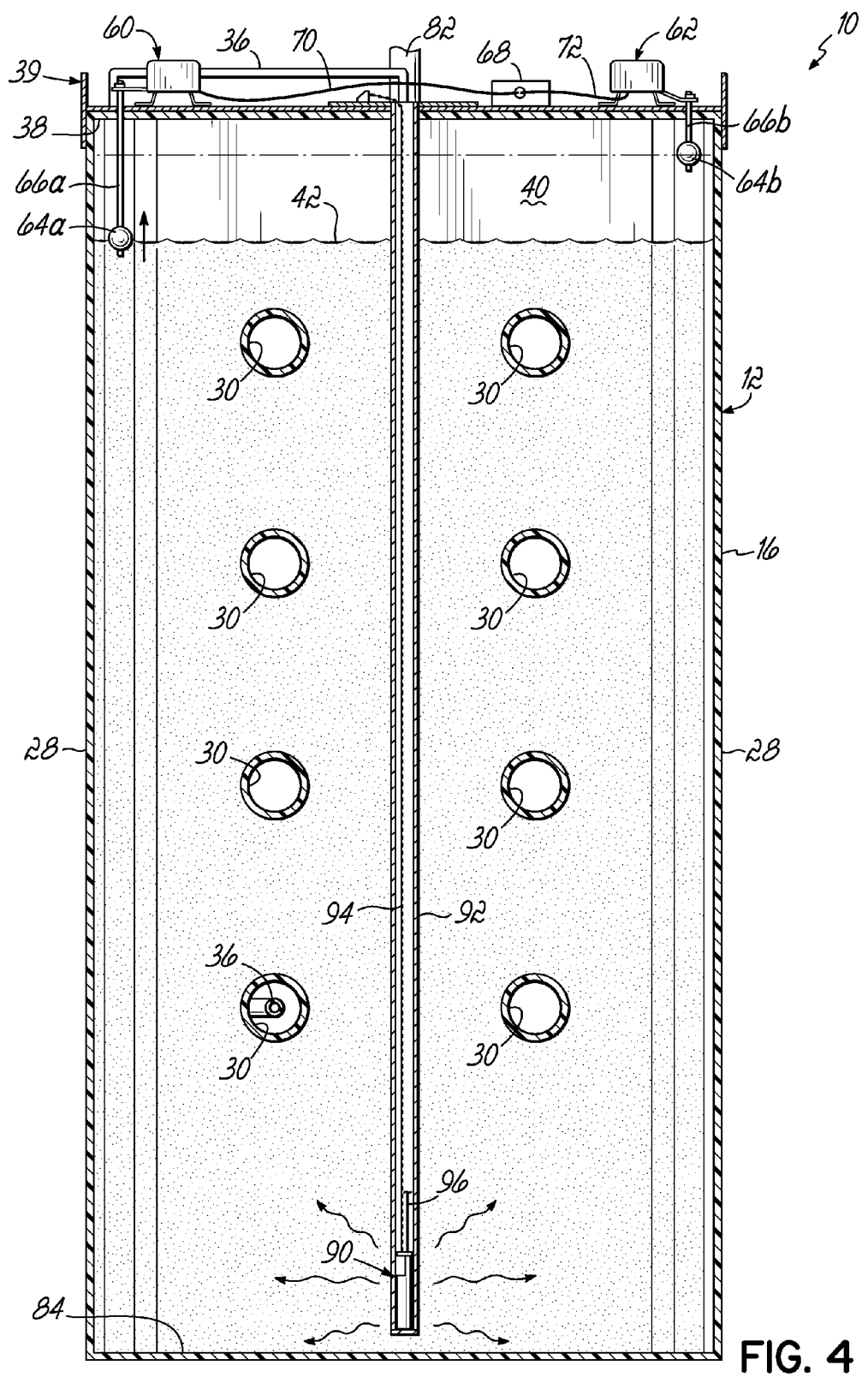
FIG. 4 is a cross-sectional view of the storage system taken along line 4-4 in FIG. 2.

FIGS. 2 and 4 illustrate two liquid level switches 60, 62 that extend from the top portion 38 into the volume 40 of the tank 12. The liquid level switches 60, 62 may include any number of configurations that are known to those of ordinary skill in the art, including, for example, floats, ultrasonic, resistive, optical, and so forth. The particular illustrative switch 60, 62 is a float level switch that includes a float 64a, 64b coupled to a rod 66a, 66b, where the rod 66a of the first switch 60 is longer than the rod 66b of the second switch 62 such that the first switch 60 is activated at a lower liquid level as compared to the second switch 62.

Each switch 60, 62 is electrically connected to an electric junction box 68 via wires 70, 72. A control panel 74 is also electrically coupled to the junction box 68 and includes three lights 76, 78, 80. A first light 78, which may be green or any other desired color, is illuminated during normal operation; however, when the used oil level reaches the first float 64a of the first switch 60 (shown in solid in FIG. 4), the first switch 60 is activated and the light 76, which may be yellow or any other color, on a control panel 74 illuminates to indicate that the used oil 42 (FIG. 3) has reached a first predetermined level. At this first predetermined level, the illuminated light 78 will serve as an indicator that the tank 12, although not completely full, should be emptied or an order placed with the reclamation service. When the used oil level reaches the second float 64b of the second switch 62 (shown in phantom in FIG. 4), the second switch 62 is activated and the light 80, which may be red or any other desired color, on a control panel 74 illuminates to indicate that the used oil 42 (FIG. 3) has reached a second predetermined level. At this second level, the illuminated light 80 will serve as an indicator that the tank 12 is full and emptying is required. If desired, an alarm may also sound to warn the users that the tank 12 is full and that no more used oil 42 (FIG. 3) should be pumped into the storage tank 12.

Typically, the used oil 42 (FIG. 3) will be removed from the storage tank 12 when the oil level is between the first predetermined level and the second predetermined level. To facilitate removing the used oil 42 (FIG. 3), the storage tank 12 includes an outlet conduit 82, which is shown in FIG. 3. The outlet conduit 82 extends into the volume 40 to almost a bottom 84 of the storage tank 12 so as to drain nearly the full volume of used oil 42 from the tank 12. In some embodiments and as shown, the bottom 84 may be sloped such that the outlet conduit 82 extends toward a lowered end of the bottom 84 to further facilitate draining; however, the sloped bottom is not required. While the outlet conduit 82 may exit the tank 12 at any location, the illustrative embodiment shows the outlet conduit 82 extending up to the top portion 38 where a fluid-tight seal around the outlet conduit 82 is not required. The outlet conduit 82 may be connected to one or more additional pipes, with or without valves and fittings, that are configured to couple the volume 40 of the tank 12 to a service vehicle (not shown) or other mobile storage unit. The service vehicle will include a pump or vacuum (not shown) operable to pump the used oil 42 (FIG. 3) out of the storage tank 12 and into a tank of the service vehicle or mobile storage unit. In some embodiments, the service vehicle or mobile storage unit may be parked outside the building housing the storage system 10. Accordingly, the outlet conduit 82 and/or the additional pipes may extend to an outside fitting (not shown).

While not specifically shown, the control panel 74 may include a button to reset the switches 60, 62 and/or lights 76 and 80 after the tank 12 has been emptied.

Figure 4A:
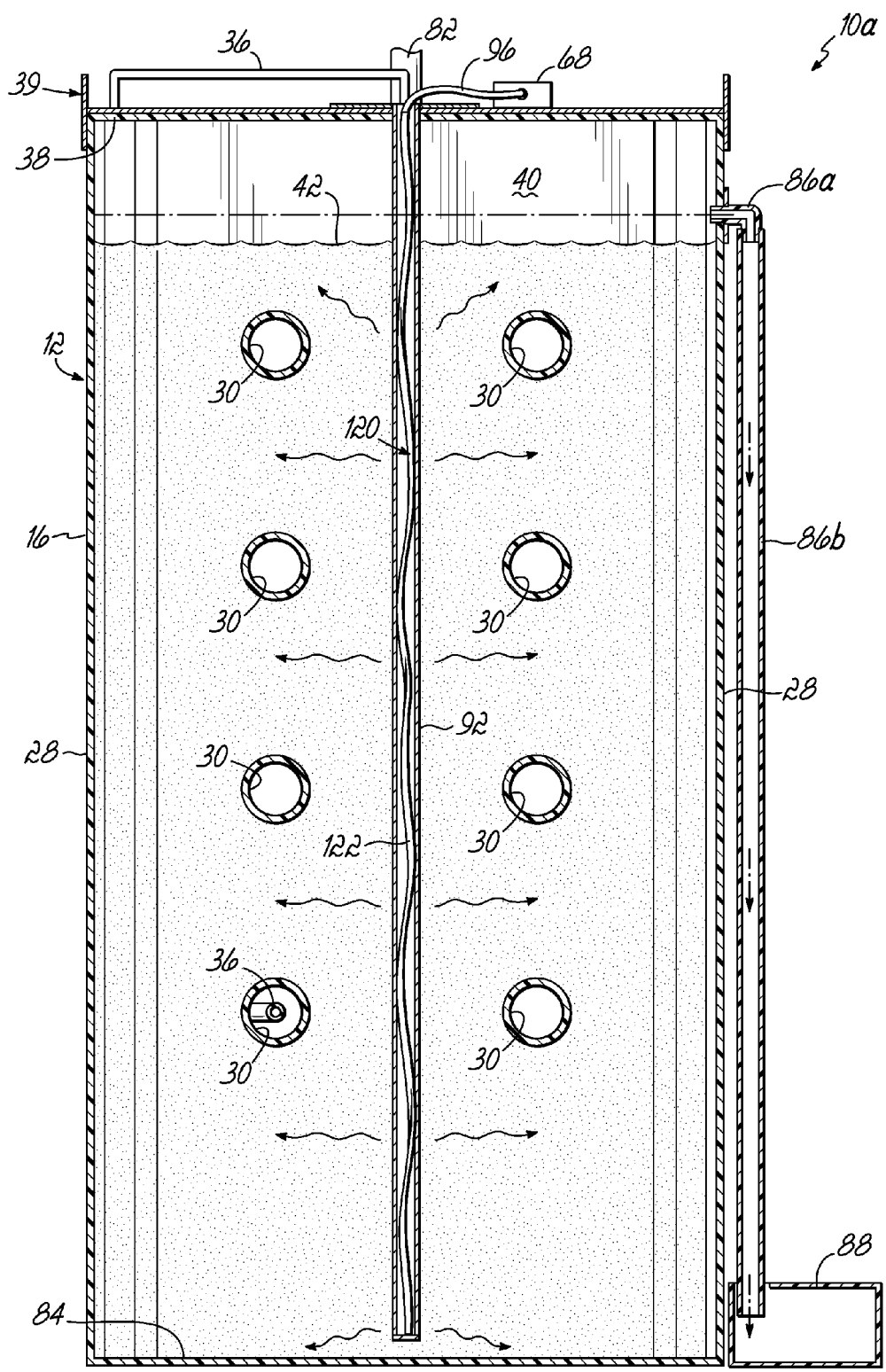
FIG. 4A is a cross-sectional view of another embodiment of a storage system.

Alternatively, and as shown in FIG. 4A, a storage system 10a having been constructed from a sufficiently transparent or translucent material, does not require one or more liquid level switches 60, 62 (FIG. 4) because the liquid level is readily and visually determinable. In such embodiments, one or more indicia (not shown) may be positioned on an outer surface of the upright section 16 to indicate first and second predetermined levels. Moreover, the upright section 16 may include an overflow tube 86a, with or without an extension 86b that leads to a used oil container 88, fluidically coupled to the volume 40 at the second predetermined level. In this way and if the storage system 10a is not emptied prior to the addition of further used oil 42, then any volume of used oil 42 meeting or exceeding the second predetermined level automatically flows through the overflow tube 86a to the used oil container 88.

Under ambient conditions, some oils and grease may partially polymerize or otherwise partially solidify making the transfer of used oil 42 more difficult. In order to keep the used oil 42 in the tank 12 in a free-flowing state (for example, a liquid state) so it can be pumped out, the storage tank 12 may be heated by a tank heater 90 to a predetermined temperature (for example, a melting point), shown in detail in FIGS. 4 and 5A. A sealed sleeve 92 extends from the top portion 38 into the volume 40 of the tank 12 and is sized to receive the tank heater 90 so that the used oil 42 does not directly contact the tank heater 90. A chain, rope, or other similar structure extends between the tank heater 90 and the top portion 38 for safely lowering the tank heater 90 into the sleeve 92. The tank heater 90 is electrically connected to a junction box 68 via an electrical conduit 96.

The tank heater 90 includes a heating element 98 surrounded by a housing 100. Ideally, though not necessarily, the outer diameter of the housing 100 is approximately the inner diameter of the sleeve 92 to efficiently transfer heat energy between the tank heater 90 and the used oil 42 of the tank 12. A terminal end 102 of the heating element 98 is coupled to a thermostat 104 for operating the heating element 98. When the thermostat activates the heating element 98, a light (not shown) located on the control panel 74 may illuminate to indicate proper function.

FIGS. 4A and 5B illustrate another embodiment of a heater 120 that is suitable for use with an embodiment of the invention. The heater 120 includes a ribbon element 122 that is configured to extend nearly the full length of the sleeve 92. In this way, heat may be more efficiently transferred to a larger area and the used oil 42 retained in the free-flowing state while consuming less energy. While the particular embodiment of the heater 120 is illustrated as a ribbon, it would be readily appreciated that other heater styles may be used, for example, a rope heater.

Figure 6:
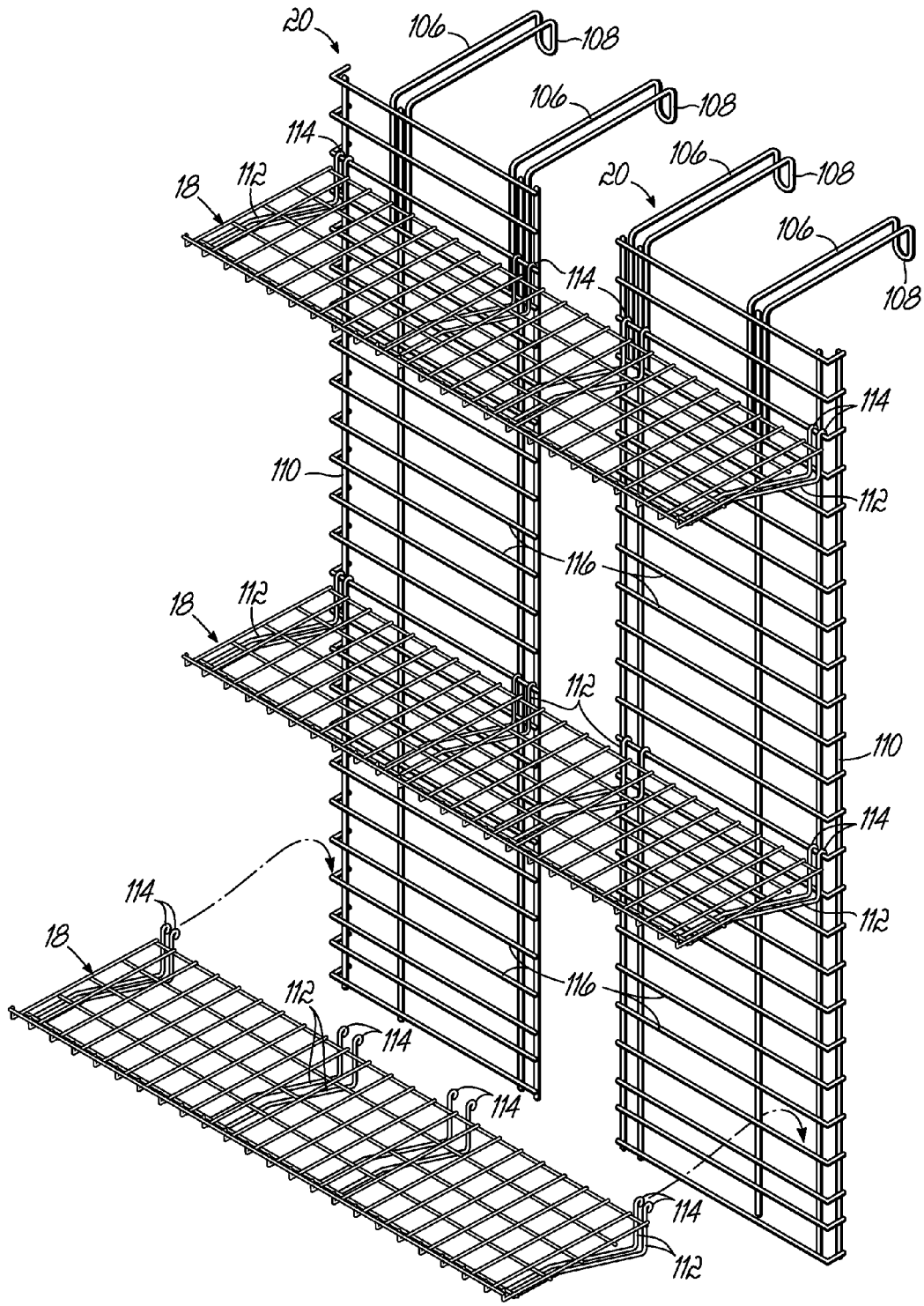
FIG. 6 is a perspective view of the plurality of shelves of the storage system shown in FIG. 1.

Turning now to FIG. 6, the details of the plurality of shelves 18 and vertical hangers 20 are shown and described. While the illustrative plurality of shelves 18 and the vertical hangers 20 are constructed from metallic or rigid polymeric wires, it would be readily understood that other construction materials may be used, such as meshes or solid constructions.

As is shown, two separate vertical hangers 20 are used in parallel to support shelves 18 that extend the full width of the upright section 16 (FIG. 1). In other embodiments, it is possible that a single or two or more vertical hangers could be used to support the full-width shelf 18 or shelves extending only a portion of the width (not shown). In any event, each vertical hanger 20 includes a hanging arm (two hanging arms 106 are shown per vertical hanger 20). The length of each hanging arm 106 is approximately the depth of the upright section 16 (FIG. 1) so that the hanging arm 106 may extend across the top of the upright section 16 (FIG. 1) between the top portion 38 (FIG. 3) and the cap 39 (FIG. 1). A downwardly-directed finger 108 of each hanging arm 106 folds down over the rear portion 32 (FIG. 3) of the tank 12 (FIG. 1) to further secure each vertical hanger 20. Additionally, each vertical hanger 20 may include a side-arm 110, as appropriate, to extend around the front-facing portion 26 (FIG. 1) to the side portion 28 (FIG. 1) of the tank 12 (FIG. 1). This provides still further stability to the vertical hangers 20.

Each shelf 18 includes an "L"-shaped support 112 that terminates in a hook 114. The hooks are shaped to receive a cross-member 116 of the vertical hanger 20 and to rotate about the cross-member 116 until the shelf 18 comes to a resting position adjacent the vertical hanger 20. Accordingly, one or more shelves 18 may be provided without disrupting the fluid-tight integrity of the tank 12 (FIG. 1).

Figure 7:
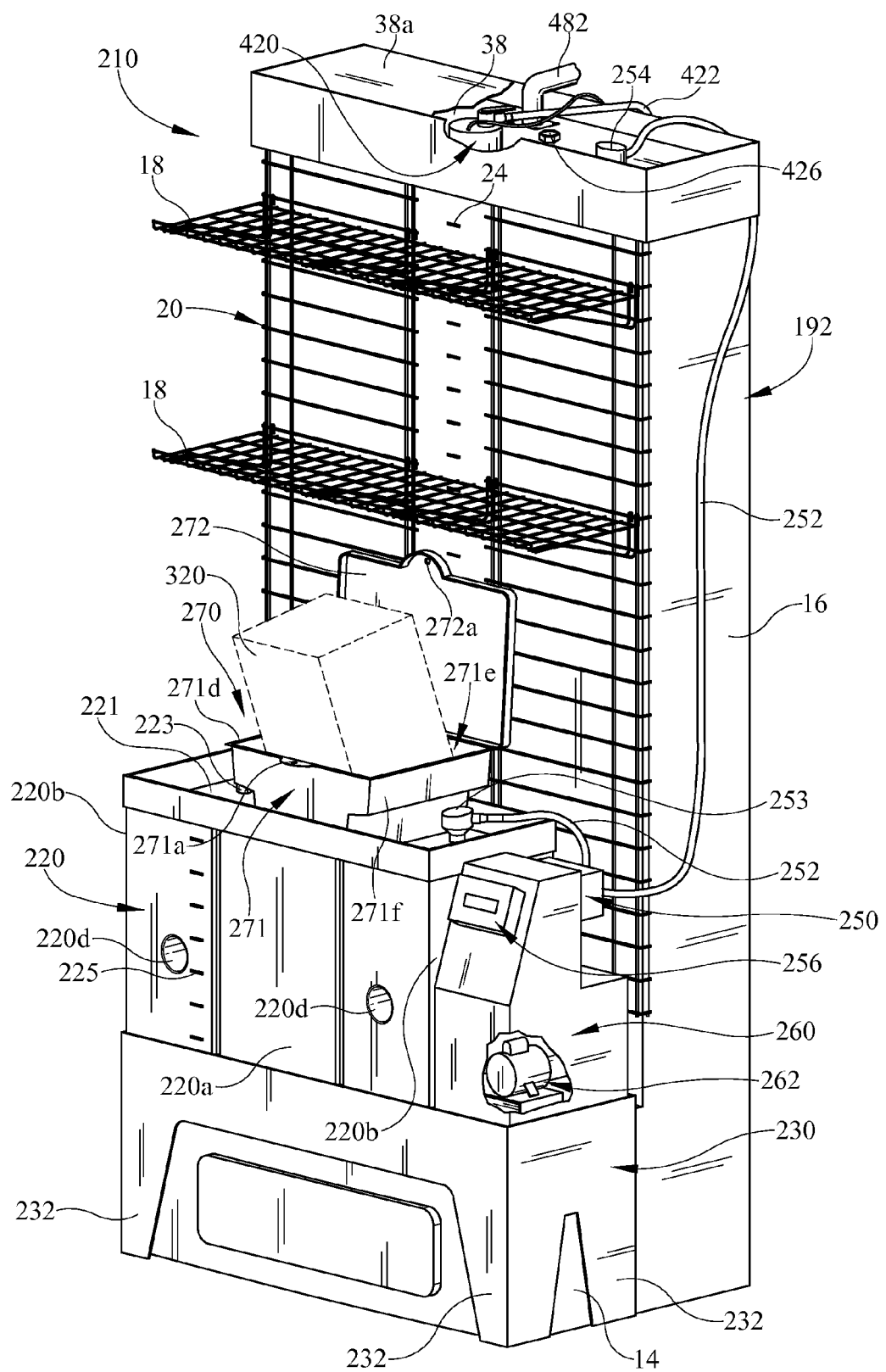
FIG. 7 is a perspective view of another embodiment of a storage system, with an inverted container shown generally in broken lines and portions of a top cover for the used oil storage tank partially broken away.
Figure 8:
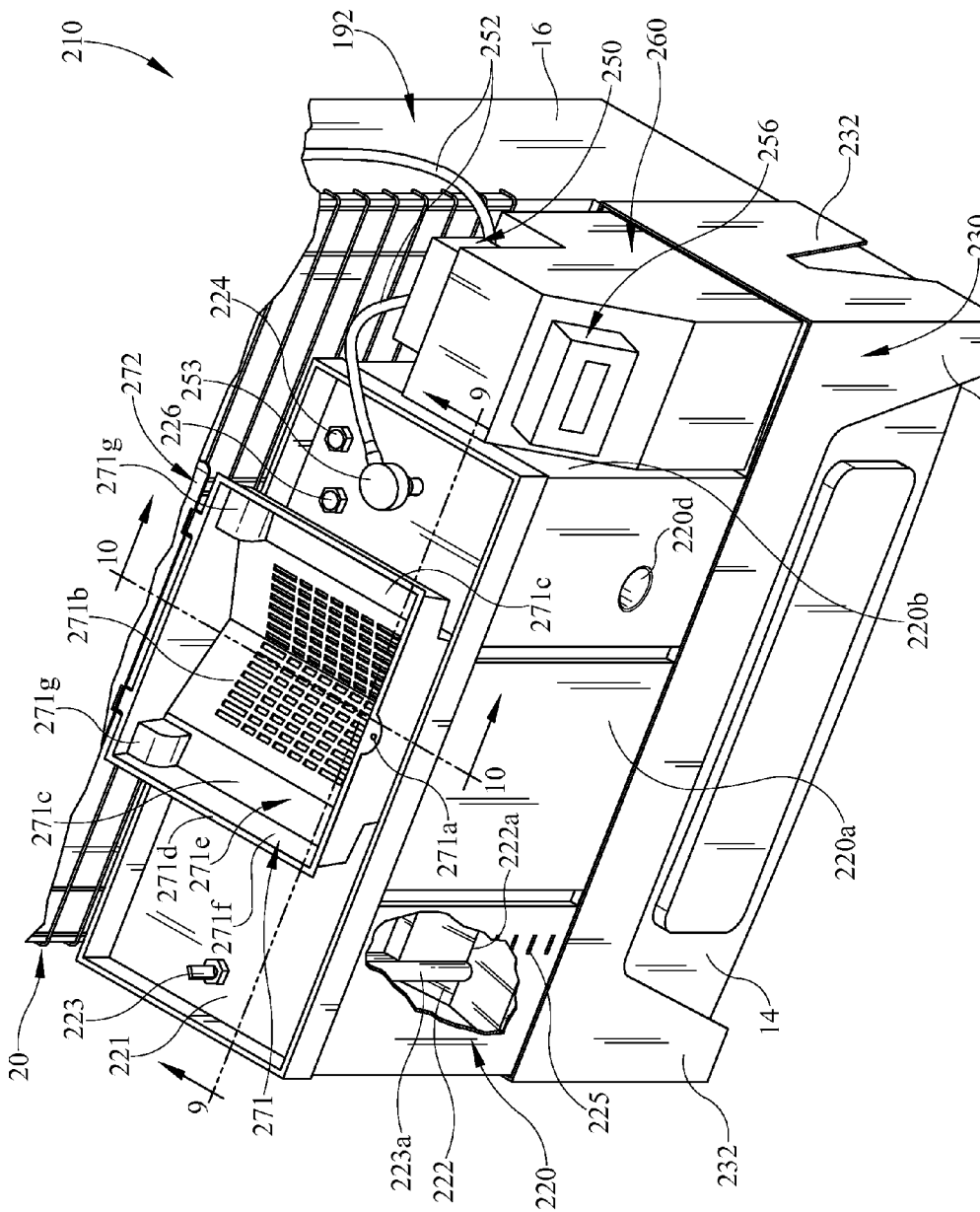
FIG. 8 is an enlarged perspective view of a virgin oil storage tank of the storage system shown in FIG. 7.
Figure 9:
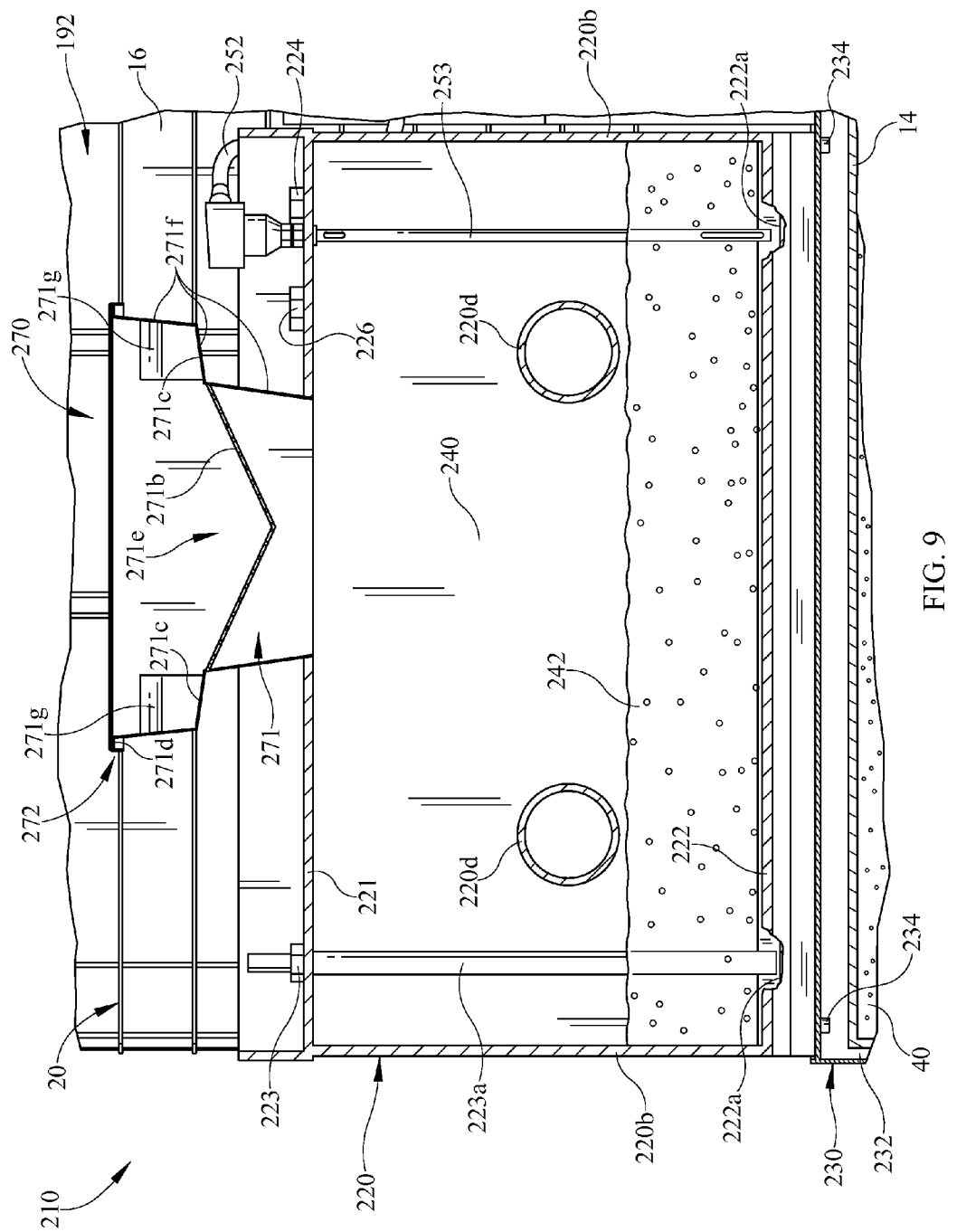
FIG. 9 is an enlarged cross-sectional view of the virgin oil storage tank taken along line 9-9 in FIG. 8.
Figure 10:
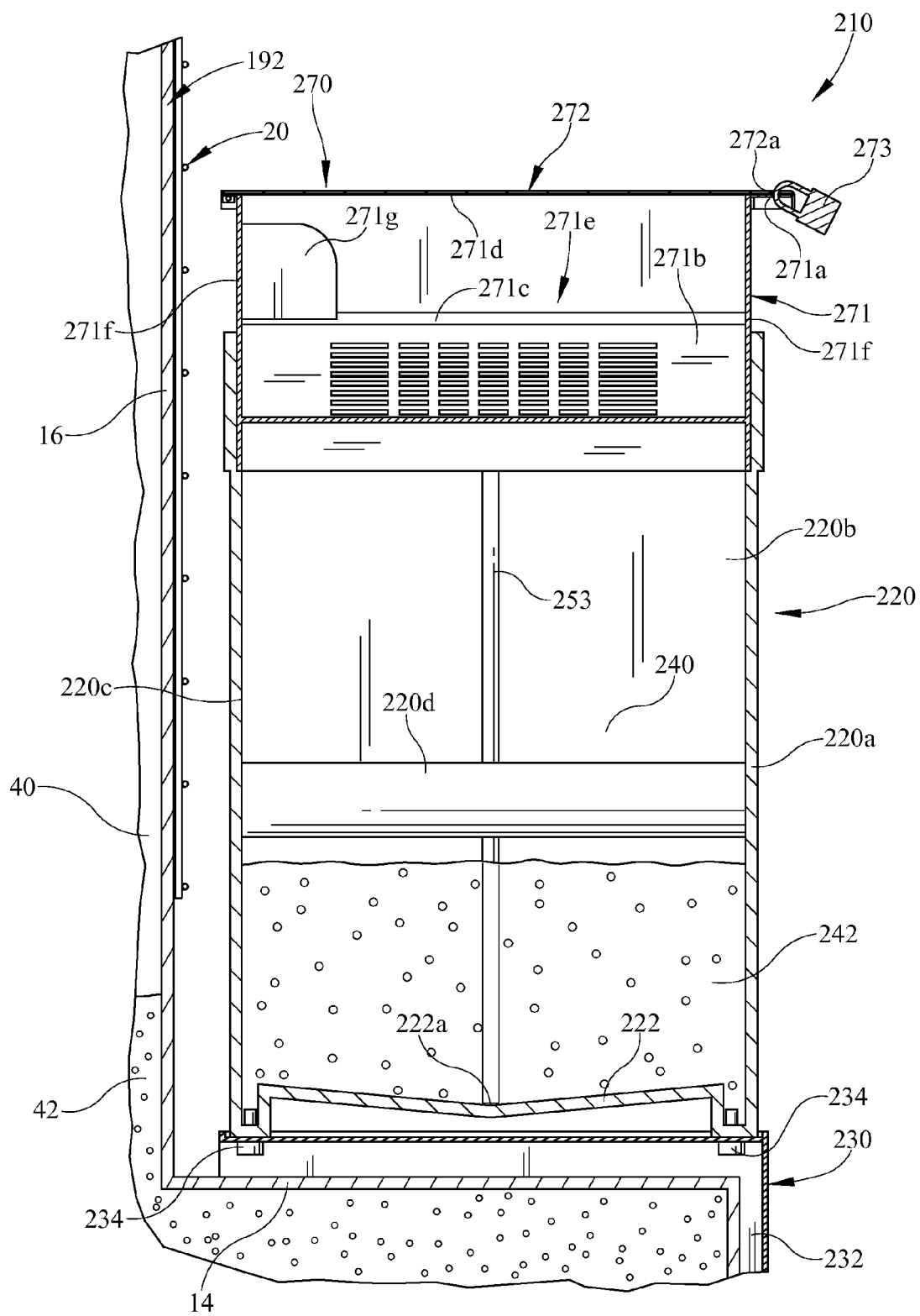
FIG. 10 is an enlarged cross-sectional view of the virgin oil storage tank taken along line 10-10 in FIG. 8.

As shown in FIGS. 7-11, a second or virgin oil storage tank 220 may be used alone or in combination with a first or used oil storage tank 192 forming a storage system 210. The first storage tank 192 being similar to the storage tank 12 described above. The second storage tank 220 includes a volume 240 capable of holding a predetermined amount of virgin oil or second liquid 242. This second liquid 242 of the second storage tank 220 is fluidly disconnected from, or not in fluid communication with, the first storage tank 192. The second storage tank 220 is in a stacking relationship with the first storage tank 192. As a result, the first and second storage tanks 192, 220, respectively, share a common footprint or overlap. Alternatively, the one or more tanks 192 and 220 may not overlap but may be in close proximity to each other. The stacking relationship may include, but is not limited to, the second storage tank 220 disposed over the first storage tank 192, or more specifically the base section 14 of the first storage tank 192. As a result, the second storage tank 220 extends vertically parallel to the upright section 16 of the first storage tank 192. Further, the second storage tank 220 may be releasably or fixedly secured to the first storage tank 192 in a variety of ways and still be within the scope of the teachings herein. Although a variety of additional structure or devices may be used to couple the storage tanks, in the embodiment shown the second storage tank 220 is supported by a base 230 in relation to the first storage tank 192. Base 230 may be made of, but is not limited to, metal, metal alloys, polymers, plastics, and any other sturdy material, but preferably is made of stainless steel. Although the base 230 may be of a variety of shapes, sizes, and constructions and still couple one or more storage tanks, it is shown as supporting the second storage tank 220 directly from the floor by legs 232 that straddle the base section 14 of the first storage tank 192. It should be understood that the base 230 may interconnect or extend directly from the first storage tank 192. The second storage tank 220 may interconnect with the base 230 in a variety of fixed or releasable methods, the illustrative embodiment shows the second storage tank 220 being releasably engaged to the base 230 by one or more bolts 234 (FIGS. 9 and 10). The engagement between the first and second storage tanks 192, 220, respectively, may result in a variety of positions of the tanks relative to each other and still provide for a multi-tank storage system. For example, the shapes or constructions of the storage tanks themselves, individually or in combination, may provide for a physical interlocking engagement or provide an interference fit engagement thereby maintaining their vertical and/or horizontal relationship therebetween.

The second storage tank 220 may include one or more passageways, for example molded passages 220d, that extend between a front-facing portion 220a and a rear-facing portion 220c (FIG. 10). The one or more molded passages 220d may permit passage therethrough of liquid conduits; reduce structural flexibility by increasing the rigidity of the second storage tank 220, resisting a tendency of the walls of the second storage tank 220 to bulge with a high liquid volume, and reducing the overall weight of the storage system 210. Other internal structural bracing may be used to increase the rigidity of the second storage tank 220 and may supplement or replace altogether the molded passages 220d.

Although second storage tank 220 is shown in detail in the drawings, it is merely representative of one embodiment, and it is to be understood that there are a variety of shapes, sizes, orientations, constructions, and quantities which may be used and still be within the scope of the teachings herein. For example, the second storage tank 220 is shown as a separately formed storage tank relative to the first storage tank 192. However, it should be understood to those skilled in the art that the storage system 210 may include an integrally formed first and second storage tank 192, 220, respectively, while still being able to maintain the separation of fluids or products therebetween.

As shown in FIGS. 7-10, the second storage tank 220 includes one or more inlets/outlets or openings to facilitate the process of filling or extracting virgin oil 242 from the second storage tank 220. One such embodiment of an inlet may be one or more pour stations 270. While the pour station 270 may enter the tank 220 at any location, the illustrative embodiment shows the pour station 270 extending through the top portion 221 of the tank 220. Pour station 270 may include a lid 272 hingedly connected to a base 271 between an open position (FIGS. 7 and 8) and a closed position (FIGS. 9 and 10). The lid 272 may be secured in a locked configuration (FIG. 10), whereby the lid 272 is closed upon the base 271 in the closed position (FIGS. 9 and 10). When in the locked configuration (FIG. 10), a locking device 273 may be secured through a corresponding aperture 272a, 271a, respectively, of each one of the lid 272 and base 271 when aligned in the closed position (FIGS. 9 and 10). The locking device 273 may include, but is not limited to, a padlock. In the unlocked and open configuration (FIGS. 7 and 8), the lid 272 is opened allowing virgin oil 242 to be poured into the base 271 and continue to the volume 240 of the second storage tank 220. The base 271 as shown may include a grate 271b to prevent undesirables to pass through the inlet opening. The base bottom 271c and/or grate 271b may be sloped such as to further facilitate draining. The base 271 may further include a rim 271d defining an opening 271e with a depending skirt 271f. The rim 271d and skirt 271f is engageable with the lid 272 in the closed position (FIGS. 9 and 10). Although not shown, a sealing engagement or structure may exist between the lid 272 and the base 271. A user is able to pour the contents directly into the inlet of the pour station 270 or invert and insert a container 320 of virgin oil into the base 271 to provide a hands-free pour. The base rim 271d and skirt 271f is structured to receive the predetermined container 320 of fresh or virgin oil. The container 320 of virgin oil is typically a standard 35 lb. box of a poly container holding the fresh oil therein. Further, the base 271 may be sloped to provide a corresponding angle to the received container 320 such as to further facilitate draining of the container. Specifically, the container 320 may rest upon one or more pads 271g within the base 271 to provide the slope or elevate one end of the inverted container 320. These pads 271g may also provide clearance for a spout or other structure of the inverted container 320. The base bottom 271c or grate 271b may include one or more sloping surfaces, specifically shown in the embodiment as each having two sloping surfaces, V-shaped, specifically sloping from opposing sides of the base skirt 271f downwardly towards a general mid-point of the base 271. The base sloping surfaces 271b, c may also provide clearance for a container spout when the container 320 is inverted into the pouring position (FIG. 7). In other embodiments, the pour station 270 may be releasably removable from the top portion 221, or may be omitted altogether in order to allow for a straight-through pour opening into the second storage tank 220. A lid or cover may be used in conjunction with the straight-through opening. Another embodiment of an inlet or opening that may be used alone or in combination with the pour station 270, may be an inlet conduit 224. While the inlet conduit 224 may enter the second storage tank 220 at any location, the illustrative embodiment shows the inlet conduit 224 extending through the top portion 221 of the second storage tank 220. The inlet conduit 224 may be connected to one or more additional pipes, with or without valves and fittings, that are configured to couple the volume 240 of the second storage tank 220 to a fresh or virgin bulk oil source. The top portion 221 may also include a vent 226 therethrough.

In use, the unused or virgin oil 242 will be removed from the second storage tank 220 when a predetermined oil level of a fryer needs to be replaced or added thereto. To facilitate removing the virgin oil 242, the second storage tank 220 includes a quick connect outlet fitting 223 (FIGS. 8 and 9), which is connected to a conduit 223a (for example, a tube). The conduit 223a enters an interior space, or volume 240, contained within the second storage tank 220 via an opening in the top portion 221 and extends at least partially into the volume 240. The conduit 223a extends into the volume 240 to almost the bottom 222 of the second storage tank 220 so as to drain nearly the full volume of virgin oil 242 from the tank, if needed. In some embodiments and as shown, the bottom 222 of the second storage tank 220 may comprise one or more sloped surfaces. Two sloped surfaces are shown such that the outlet conduit 223a extends toward a lowered end 222a of the bottom 222 to further facilitate draining; however, the sloped bottom 222 is not required. While the outlet conduit 223a may exit the second storage tank 220 at any location, the illustrative embodiment shows the outlet conduit 223a extending up to the top portion 221 where a fluid-tight seal around the outlet fitting 223 is not required. The outlet fitting 223 may be connected to one or more additional pipes, with or without valves and fittings, that are configured to couple the volume 240 of the tank 220. The virgin oil 242 may be extracted from the second storage tank 220 and placed into a mobile storage tank, commonly referred to as a caddie 44 (FIG. 1) as described above. A conduit 54 (i.e., tubing or hose) extends from the pump 48, which may be operated in both a fill and an empty mode. Accordingly, when the fryer needs to be filled, the caddie 44 is transported to the storage system 210 and the conduit 54 is coupled to the outlet fitting 223. The pump 48 is operated in the fill mode such that the virgin oil 242 moves from the second storage tank 220 to the caddie tank 46. When the tank 46 is full, the pump 48 is turned off and the conduit 54 is disconnected from the outlet fitting 223. The caddie 44 is then moved to the fryer. The pump 48 on the caddie 44 is then turned on and operated in the empty mode such that the virgin oil 242 is pumped through the conduit 54 of the caddie 44 and into the fryer. When the caddie 44 is empty or the fryer is filled to a predetermined level, the pump 48 is turned off.

Alternatively, though not specifically shown, the virgin oil 242 may be directly transferred from the second storage tank 220 to the fryer or desired location. For example, a pump/motor assembly 262 (FIG. 7) positioned within housing 260 may be included on the fryer or storage system 210 and may have a conduit (not shown) that extends from the outlet fitting to the fryer. Manual or automatic operation of the pump/motor assembly 262 transfers the virgin oil 242 directly from the second storage tank 220 to the fryer or destination. For example, a manual wand may be used by the operator to deliver a desired amount of virgin oil 242 into the fryer, or the fryer or other device may have controls or software to automatically pump a desired amount of virgin oil into the fryer.

The second storage tank 220 in the figures may be made from, but is not limited to, a polyethylene, for example a high density hexane copolymer that is NSF 61 rated, a polypropylene, or other similar material that is at least partially transparent or translucent so that the liquid level in the tank can be readily observed external to the tank. Furthermore, a graduated scale 225 (FIGS. 7 and 8), for example, one or more marked indicia or dimples, may be located on a front-facing portion 220a of the second storage tank 220 so that the liquid level in the tank can be readily determined. A graduated scale may additionally or alternatively be positioned on one or both side portions 220b of the second storage tank 220.

Figure 11:
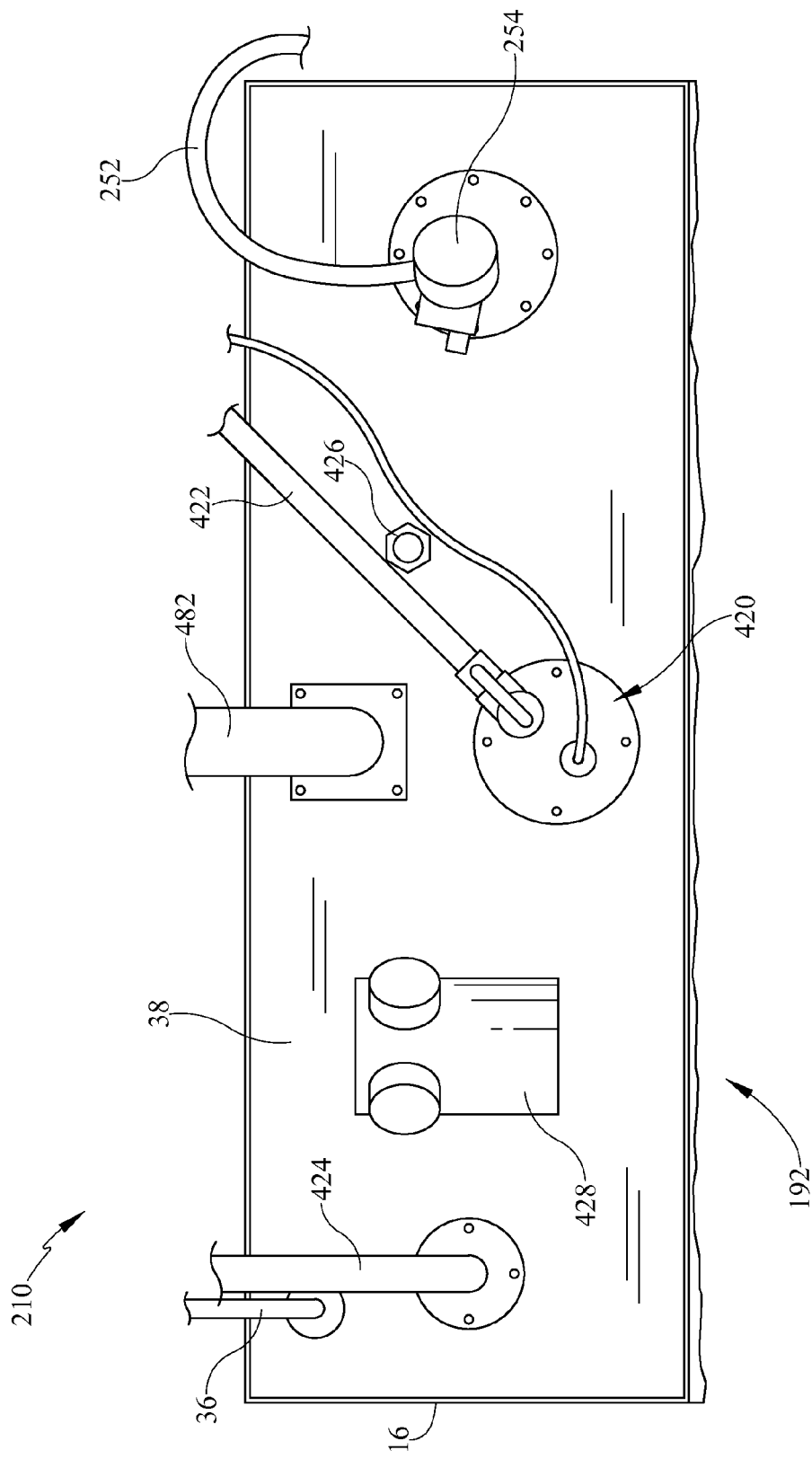
FIG. 11 is an enlarged top view of the first storage tank shown in FIG. 7 with the top cover completely broken away.

As shown in FIGS. 7 and 8, one or more digital readouts or control panels 256 may provide real time volume levels for both the used oil 42 of the first storage tank 192 and the virgin oil 242 of the second storage tank 220. FIGS. 7 and 11 illustrate a first liquid level switch 254 that extends from the top portion 38 into the volume 40 of the first storage tank 192. FIGS. 7-10 illustrate a second liquid level switch 253 that extends from the top portion 221 into the volume 240 of the second storage tank 220. Each switch 253 and 254 is electrically connected to electric controls or junction box 250 via wires 252. One or more control panels 256 are also electrically coupled to the junction box 250. While the control panel 256 and/or junction box 250 may be positioned at any location, the illustrative embodiment shows the control panel 256 mounted on an angled exterior surface of a housing 260, and the junction box 250 may be connected interiorly and/or exteriorly to the housing 260. The first and second liquid level switches 254, 253, respectively, may include any number of configurations that are known to those of ordinary skill in the art, including, for example, floats, ultrasonic, resistive, optical, and so forth. Generally speaking, the liquid level switches describe methods of measuring the volume of a liquid. An additional embodiment for measuring a liquid volume may include, but is not limited to, a radar level transmitter. If a radar level transmitter is used, a sensor may be positioned within its respective storage tank within an elongated metal sleeve open to the liquid contained therein. The open ended metal sleeve may be positioned within one inch from the bottom of its respective storage tank. A controller or control device (not shown) within the junction box 250 can monitor the output of the liquid level switches 253 and 254, the liquid level of the first storage tank 192 and the liquid level of the second storage tank 220, or any number of devices monitoring the storage system 210 to output a number of electrical signals to the control panel 256 or other such devices to display or communicate information to the user. The control panel 256 may be set to display the weight or volume of the liquid contained within each storage tank to provide for a continuous monitoring of liquids, and may indicate a low level, mid range, and high level.

At a predetermined level of the used oil 42, one or more control panels 256 may serve as an indicator that the first storage tank 192, although not completely full, should be emptied or an order placed with the reclamation service. At a predetermined level of the separate virgin oil 242, one or more controls panels may serve as an indicator that the second storage tank 220, although not completely empty, should be filled to reach a desirable volume of virgin oil 242. If desired, a visual or audible alarm may also sound to warn the users that the first storage tank 192 is full and that no more used oil 42 (FIG. 10) should be pumped into the first storage tank 192 or that the second storage tank 220 is empty or at a level that virgin oil 242 should be ordered or filled into the second storage tank 220.

FIGS. 7 and 11 illustrate another embodiment of a heater 420 that is suitable for use with an embodiment of the invention. The heater 420 includes an elongated metal sleeve containing a heating device submerged in a liquid medium suitable to optimize heat transfer, such as, for example polypropylene glycol (not shown). The elongated metal sleeve separates the heat transfer medium contained therein from the used oil 42. The heating device efficiently transfers heat from the heated liquid medium through the sleeve and into the used oil 42. While one particular embodiment of the heater 420 is described and shown, it would be readily appreciated that other heater styles may be used. Further, the heater 420 may include an overflow vent 422. As shown in FIG. 11 to facilitate removing the used oil 42, the first storage tank 192 may include an outlet conduit 482. The outlet conduit 482 extends into the volume 40 to almost the bottom of the first storage tank 192 so as to drain nearly the full volume of used oil 42 from the tank 192. While the outlet conduit 482 may exit the first storage tank 192 at any location, the outlet conduit 482 extends up to the top portion 38 where a fluid-tight seal around the outlet conduit 482 is not required. The outlet conduit 482 may be connected to one or more additional pipes, with or without valves and fittings, that are configured to couple the volume 40 of the first storage tank 192 to a service vehicle (not shown) or other mobile storage unit. The service vehicle may include a pump or vacuum (not shown) operable to pump the used oil 42 out of the first storage tank 192 and into a tank of the service vehicle or mobile storage unit. In some embodiments, the service vehicle or mobile storage unit may be parked outside the building housing the storage system 210. Accordingly, the outlet conduit 482 and/or the additional pipes may extend to an outside fitting (not shown). Further illustrated in one embodiment of the first storage tank 192, another inlet conduit or opening 424 may be used alone or in combination with the conduit 36. While the inlet conduit 424 may enter the first storage tank 192 at any location, the illustrative embodiment shows the inlet conduit 424 extending through the top portion 38 of the first storage tank 192. The inlet conduit 424 may be connected to one or more additional pipes, with or without valves and fittings, that are configured to couple the volume 40 of the first storage tank 192 to the used oil source. The used oil 42 may be directly transferred from the fryer to the first storage tank 192. For example, a pump (not shown) may be included on the fryer and include a conduit that extends from the fryer to the inlet conduit 424. Operation of the pump transfers the used oil 42 directly from the fryer to the first storage tank 192. The top portion 38 may also include a fill port 426 therethrough associated with a vacuum pump 428 for a grill grease warmer. A top cover 38a (FIG. 7) may be used to enclose one or more of the devices or electrical components extending through the top portion 38 of the first storage tank 192.

While the present invention has been illustrated by a description of various embodiments, and while these embodiments have been described in some detail, they are not intended to restrict or in any way limit the scope of the appended claims to such detail. Additional advantages and modifications will readily appear to those skilled in the art. The various features of the invention may be used alone or in any combination depending on the needs and preferences of the user. This has been a description of the embodiments, along with methods of practicing the embodiments as currently known. However, the embodiments itself should only be defined by the appended claims.

We claim:

1. A liquid storage system comprising:
   a first storage tank having a base section and an upright section and coupled to a second storage tank situated above said base section, said first storage tank capable of storing used oil and said second storage tank capable of storing virgin oil, wherein said first storage tank is in non-fluid communication with said second storage tank;
   said first storage tank includes a first liquid volume continuous between said base section and said upright section, wherein said base section and said upright section of said first storage tank have a common first liquid level;
   said second storage tank includes a second liquid level;
   said first storage tank having an inlet and an outlet;
   said second storage tank having an inlet and an outlet; and
   wherein said second storage tank includes at least one pour station positioned on a top portion of said second storage tank and defining said inlet of said second storage tank, wherein said pour station includes a rim and a depending skirt defining an opening, wherein said depending skirt extends downwardly towards a grate, and wherein at least one pad extends into said opening and has an upper surface located above the uppermost elevation of said grate, wherein said opening of said pour station is adapted to receive an inverted container of fresh oil for draining through said grate into said inlet of said second storage tank.

2. The liquid storage system of claim 1 wherein said second storage tank releasably secures to said first storage tank.

3. The liquid storage system of claim 1 further including a base having a plurality of legs straddling said base section of said first storage tank, said base supporting said second storage tank at a distance above said first storage tank.

4. The liquid storage system of claim 3 further including a control device monitoring said common first liquid level of said base and upright sections of said first storage tank and said second liquid level of said second storage tank, wherein said control device is also supported by said base above said base section of said first storage tank.

5. The liquid storage system of claim 3 wherein said base is attached to said second storage tank by one or more fasteners.

6. The liquid storage system of claim 1 wherein said first storage tank and said second storage tank are integrally formed.

7. The liquid storage system of claim 1 wherein said pour station includes a flip top lid hingedly connected between an open position and a closed position.

8. The liquid storage system of claim 7 wherein said pour station includes a locking device securing said flip top lid in said closed position.

9. The liquid storage system of claim 1 further including one or more liquid level switches.

10. The liquid storage system of claim 1 further comprising a base bottom extending into said opening, wherein an upper surface of said base bottom is positioned below said at least one pad upper surface.

11. The liquid storage system of claim 10 wherein said base bottom is positioned on an opposite side of said opening relative to said at least one pad.

12. The liquid storage system of claim 11 wherein said grate includes a single valley edge extending in a direction between said base bottom and said at least one pad.

13. The liquid storage system of claim 1 wherein said at least one pad upper surface is below said rim.

14. A liquid storage system comprising:
   two or more liquid storage tanks, wherein said two or more storage tanks are not in fluid communication with each other, each said storage tank includes at least one opening for adding or extracting liquid;
   at least one of said two or more storage tanks includes a base section and an upright section, a single liquid level within a continuous volume between said base and upright sections, and a liquid level switch configured to transmit a signal indicating said single liquid level within said continuous volume of said base and upright sections of said at least one of said two or more storage tanks;
   another one of said two or more storage tanks is disposed over said base section of said at least one of said two or more storage tanks; and
   a pour station in fluid communication with said at least one opening of said another one of said two or more storage tanks that is disposed over said base section, wherein said pour station includes a lid covering a base, wherein said base includes a rim and a depending skirt defining an opening, wherein said depending skirt extends downwardly towards a base bottom extending into said opening, wherein a V-shaped grate depends downwardly from said base bottom towards said base thereby creating a single valley edge, wherein said opening includes one or more pads having an upper surface, wherein said upper surface is located above said base bottom to receive a container inverted upon and abutting said one or more pads and said base bottom to facilitate draining of the received container.

15. The liquid storage system of claim 14 further including a control panel receiving said signal of each one of said two or more storage tanks.

16. The liquid storage system of claim 14 further including a base having a plurality of legs straddling said base section, said base supporting and spacing said another one of said two or more storage tanks at a distance above said at least one of said two or more storage tanks.

17. The liquid storage system of claim 14 wherein said lid is hingedly connected to said base.

18. The liquid storage system of claim 14 wherein said pour station includes a locked configuration.

19. The liquid storage system of claim 14 wherein said base bottom is non-perforated.

* * * * *